United States Patent
Lucchino et al.

(10) Patent No.: US 10,710,566 B2
(45) Date of Patent: Jul. 14, 2020

(54) POWERED VEHICLE INCLUDING A SAHR BRAKE

(71) Applicant: CNH Industrial America LLC, New Holland, PA (US)

(72) Inventors: Stefano Greco Lucchino, Rubiera (IT); Gianni Passalacqua, Modena (IT); Pier Paolo Prandini, San Giovanni Persiceto (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/770,201

(22) PCT Filed: Oct. 20, 2016

(86) PCT No.: PCT/EP2016/075296
§ 371 (c)(1),
(2) Date: Apr. 21, 2018

(87) PCT Pub. No.: WO2017/068083
PCT Pub. Date: Apr. 27, 2017

(65) Prior Publication Data
US 2018/0304874 A1 Oct. 25, 2018

(30) Foreign Application Priority Data
Oct. 21, 2015 (IT) .............................. UB2015A5206

(51) Int. Cl.
*B60T 13/04* (2006.01)
*B60T 13/22* (2006.01)
(Continued)

(52) U.S. Cl.
CPC ................ *B60T 13/22* (2013.01); *B60T 8/17* (2013.01); *B60T 13/686* (2013.01);
(Continued)

(58) Field of Classification Search
CPC ......... B60T 13/22; B60T 13/38; B60T 17/086
See application file for complete search history.

(56) References Cited

U.S. PATENT DOCUMENTS 5,904,228 A * 5/1999 Eike ........................ B60T 13/22
188/170
5,984,425 A * 11/1999 Orzal .................... B60T 15/041
188/170
(Continued)

FOREIGN PATENT DOCUMENTS

JP 2004217009 A * 8/2004

OTHER PUBLICATIONS

Machine translation of JP 2004-217009 (no date).*

*Primary Examiner* — Nicholas J Lane
(74) *Attorney, Agent, or Firm* — Rickard K. DeMille; Rebecca L. Henkel

(57) ABSTRACT

A powered vehicle includes a spring-applied hydraulic release (SAHR) vehicle brake comprising first and second mutually engageable brake elements. The first brake element is secured to or forms part of a rotatable element of the drive train of the vehicle and the second is non-rotatably moveably mounted on the vehicle such that the first and second elements are mutually engageable with and separable from one another. Mutual engagement of the brake elements causes braking of rotation of the rotatable element. The SAHR vehicle brake includes (i) a resiliently deformable member acting on the second brake element so as to urge the first and second brake elements into mutual engagement and (ii) a hydraulic control circuit for applying hydraulic pressure to the second brake element so as to oppose the action of the resiliently deformable member and thereby normally maintain the first and second brake elements separated from one another.

13 Claims, 1 Drawing Sheet

(51) Int. Cl.
*B60T 17/08* (2006.01)
*B60T 8/17* (2006.01)
*B60T 13/68* (2006.01)
*B60T 15/02* (2006.01)

(52) U.S. Cl.
CPC .......... *B60T 15/028* (2013.01); *B60T 17/086* (2013.01); *B60T 2270/40* (2013.01)

(56) References Cited

U.S. PATENT DOCUMENTS

| | | | |
|---|---|---|---|
| 2008/0093917 A1* | 4/2008 | Vescovini | B60T 13/22 303/3 |
| 2008/0142316 A1* | 6/2008 | Rocca | B60T 13/22 188/151 A |
| 2010/0127560 A1* | 5/2010 | Mamei | B60T 13/148 303/2 |
| 2013/0069423 A1* | 3/2013 | Rowan | B60T 13/22 303/2 |
| 2016/0200305 A1* | 7/2016 | Han | B60T 13/662 188/170 |
| 2018/0304877 A1* | 10/2018 | Ciarrocchi | B60T 13/22 |

* cited by examiner

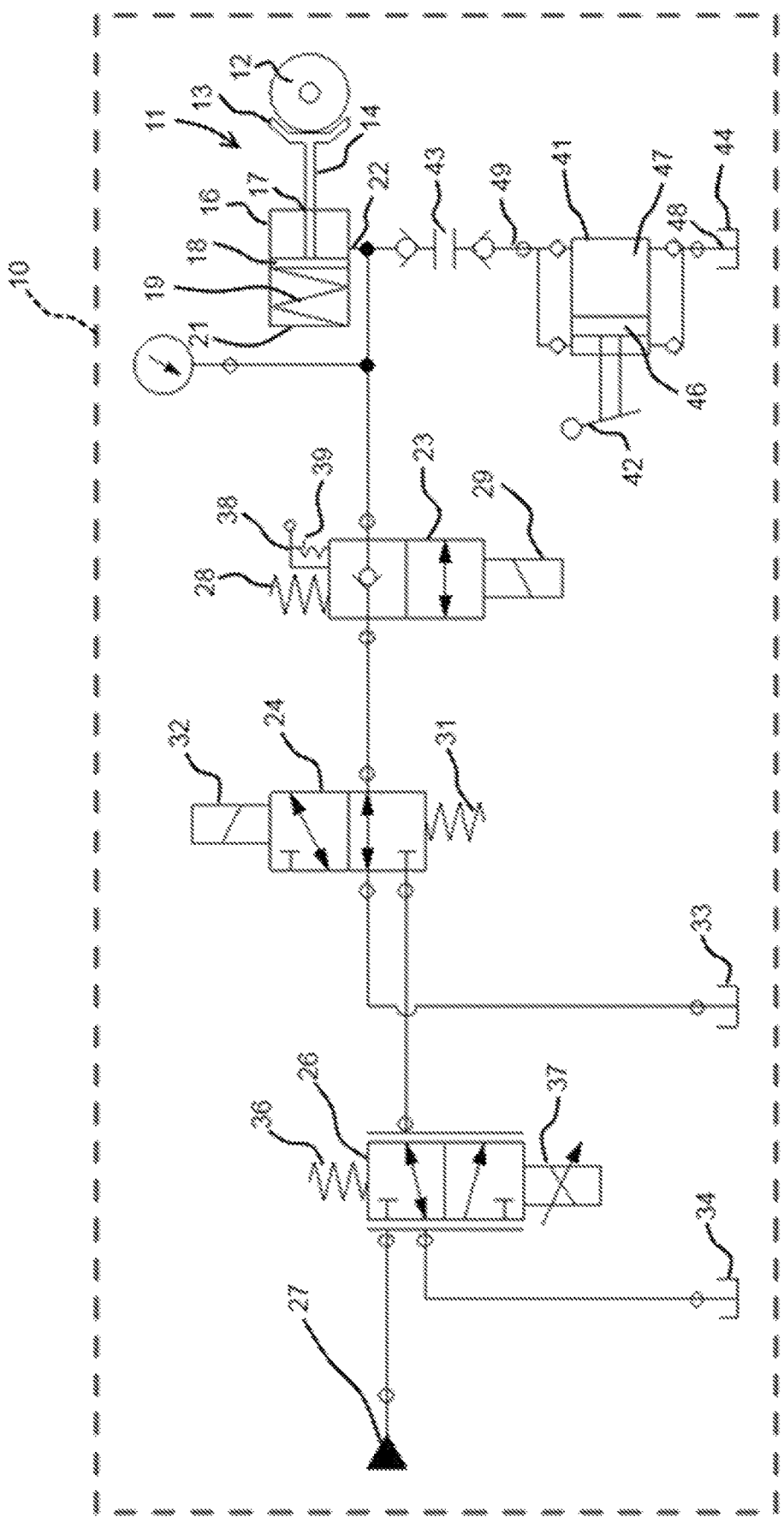

POWERED VEHICLE INCLUDING A SAHR BRAKE

CROSS REFERENCE TO RELATED APPLICATIONS

This application is a U.S. National Stage filing of International Application Serial No. PCT/EP2016/075296 entitled "A POWERED VEHICLE INCLUDING A SAHR BRAKE," filed Oct. 20, 2016, which claims priority to Italian Application Serial No. UB2015A005206, filed Oct. 21, 2015, each of which is incorporated by reference herein in its entirety for all purposes.

BACKGROUND OF THE INVENTION

The invention relates to a powered land vehicle including at least one spring-applied hydraulic release (SAHR) vehicle brake.

In such a brake first and second brake elements, mounted respectively on a rotatable part of the drive train of the vehicle such as a rotatable wheel on the one hand and on a non-rotatable part such as a suspension component or the vehicle frame on the other are moveable between mutually engaged and separated configurations.

In the separated configuration the rotatable component is free to rotate, thereby permitting the transmission of drive from e.g. a diesel engine forming part of the vehicle to a ground-engaging member such as a wheel including a tyre. In the mutually engaged configuration the second element brakes rotation of the rotatable component supporting the first brake element with the result that the transmission of drive is prevented and therefore the vehicle as a whole is braked.

In almost all cases the second brake element is moveable towards and away from the first brake element. A resiliently deformable member such as a coil spring acts on the second element or on a member connected thereto in order to bias it into engagement with the first brake element.

The second brake element includes or is connected to a piston in a chamber having a connection to a hydraulic control circuit that is capable of applying pressure to the piston and hence indirectly to the second brake element itself. The hydraulic control circuit is selectively capable of being energised in order to assure separation of the first and second brake elements under normal circumstances. As a result the rotatable element is maintained able to rotate most of the time.

When the vehicle operator selects the brake function however control elements connected to the hydraulic control circuit cause venting of the fluid pressure acting on the piston. This in turn permits the resiliently deformable spring to urge the second brake element into engagement with the first, whereby application of the SAHR brake occurs in order to brake the vehicle regardless of the output of the engine or operative status of a variable-ratio transmission forming part of the drive train of the vehicle.

Thus the SAHR vehicle brake serves primarily as a park brake that is intended reliably to brake the vehicle when it is stationary, regardless of whether the engine of the vehicle is running. The design of the SAHR lends itself to this use because the presence of the resiliently deformable spring maintains the vehicle in a braked condition even when the engine is switched off.

SAHR vehicle brakes typically are fitted in large, powered land vehicles such as tractors, combine harvesters, forage harvesters and other harvesting machines, excavators, bulldozers, utility vehicles such as farm loaders and multipurpose farm vehicles, mobile cranes, and similar vehicles that while designed to perform specialised tasks usually in off-road situations nonetheless are intended to travel on roads between work sites. SAHR vehicle brakes are required in such vehicles to provide for operator and third party safety in both on-road and off-road situations. The invention is of utility in all vehicles of the general kind listed above, together with numerous further vehicle types.

As indicated the braking systems of large vehicles of the general category indicated typically are electrohydraulic and therefore consist of braking elements the mutual engagement and separation of which is under the control of one or more hydraulic circuits. The hydraulic circuits include circuit components such as valves the operating states of which are alterable between two or more configurations through the action of electrically powered elements such as solenoids that move moveable parts of the valves from one position to another.

SAHR vehicle brakes by reason of the permanent tendency of the spring to urge the brake elements into engagement include failure safety in their designs. A drawback of this however is that in the event of a sudden failure of the electrical system forming part of the electrohydraulic braking arrangement the SAHR brake can be applied very rapidly and without warning. If such a scenario arises while the vehicle is moving it can lead to vehicle accidents that in view of the large sizes of the vehicles in which SAHR vehicle brakes are installed have the potential to be very serious.

Thus there is a need for failure safety in SAHR vehicle brakes such that in the event of e.g. an electrical failure involving the control elements of the electrohydraulic circuit while the vehicle is moving (or while the vehicle is moving at a speed that is greater than a threshold level) the brake does not automatically apply as outlined above.

Equally importantly the failure of some components of an SAHR brake can lead to other potentially dangerous situations. As an example of a value that normally is responsible for renting the hold—off fluid pressure acting on the piston becomes struck in a non-venting position activation of SAHR brake would not happen as demanded by the vehicle driver and/or the control systems of the vehicle.

There is a further need that a vehicle operator should remain capable of applying the SAHR brake in order to meet a park braking requirement at zero or a chosen low vehicle speed even if there has been an electrical failure involving the control elements of the circuit.

It is furthermore desirable for the SAHR brake to be operable even when the vehicle ignition is switched off; and for the SAHR brake under non-fault conditions to be capable of automatically releasing when the vehicle starts to move following a period of non-movement. When the SAHR brake is applied in a stationary vehicle/parking situation the braking effort should be sufficient to assure non-movement of the vehicle at least on an incline the gradient of which is less than a predetermined threshold.

Yet a further requirement in the art is for an SAHR brake that can be applied safely, i.e. progressively under operator control, and not suddenly, in an emergency braking situation.

The invention seeks to solve or at least ameliorate one or more problems encountered in prior art SAHR brakes.

SUMMARY OF THE INVENTION

According to the invention in a first aspect there is provided a powered vehicle including a spring-applied hydraulic release (SAHR) vehicle brake comprising first and second mutually engageable brake elements the first of which is secured to or forms part of a rotatable element of the drive train of the vehicle and the second of which is non-rotatably moveably mounted on the vehicle such that the first and second elements are mutually engageable with and separable from one another, mutual engagement of the brake elements causing braking of rotation of the rotatable element, the SAHR vehicle brake including (i) a resiliently deformable member acting on the second brake element so as to urge the first and second brake elements into mutual engagement and (ii) a hydraulic control circuit for applying hydraulic pressure to the second brake element so as to oppose the action of the resiliently deformable member and thereby normally maintain the first and second brake elements separated from one another, wherein the vehicle includes a non-electric fail-safe comprising a hydraulic release valve that is alterable between a one-way valve configuration effective when a driving mode of the vehicle is selected and that permits the application of pressure to the second brake element and prevents venting thereof; and a pressure relief configuration effective in the event of failure of an electrical control of the hydraulic release valve and that provides two-way flow of hydraulic fluid via the hydraulic release valve, the hydraulic release valve including a biasser biasing the hydraulic release valve to the one-way valve configuration.

This arrangement beneficially solves the problem, set out above, of failure of the SAHR brake by reason of an electrical failure that otherwise could cause the sudden application of the SAHR brake. The vehicle of the invention addresses this problem through the provision of a hydraulic release valve that becomes locked in its one-way valve configuration in the event of an electrical control failure. Such locking prevents venting of the fluid pressure acting on the piston with the result that the brake elements are held in their separated positions.

This effect of the hydraulic release valve is achieved through the presence of the baisser, which exclusively controls the position of the hydraulic release valve in the event of an electrical control failure.

In preferred embodiments of the invention the hydraulic release valve includes a manual actuator for overcoming the bias of the biasser and manually selecting the pressure relief arrangement in preference to the one-way valve arrangement. Such a feature advantageously allows the application of the SAHR brake when there has been an electrical failure in the hydraulic control circuit, or when the ignition of the vehicle is switched off.

Preferably the hydraulic release valve normally assures the application of hydraulic pressure to the second brake element and causes or permits venting of such pressure to allow mutual engagement of the first and second brake elements under the influence of the resiliently deformable member when the speed of the vehicle is below a threshold. Such an arrangement advantageously accommodates the requirement, set out above, to prevent unwanted actuation of the SAHR brake while the vehicle is in motion at a speed greater than the threshold. As long as the threshold speed is established at a sufficiently low value this assures that SAHR brake-derived accidents do not occur.

Conveniently the hydraulic control circuit includes a two-position hydraulic valve connected in series with the hydraulic release valve, the two-position hydraulic valve being alterable between an energising configuration in which it connects the hydraulic release valve to a source of pressurised fluid, and a venting configuration in which it connects the hydraulic release valve to a drain or tank.

This feature of the invention permits a mode of operation of the SAHR brake in which either a supply of pressurised fluid may be connected to act on the second brake element, regardless of whether the hydraulic release valve is in its one-way flow or two-way flow configuration; or the hydraulic circuit can be connected to vent hydraulic pressure via a drain or tank when the hydraulic release valve adopts the two-way flow configuration in order to permit rapid application of the SAHR brake when required. This is explained in more detail below.

Further preferably the hydraulic control circuit includes a proportional hydraulic valve connected in series with the two-position hydraulic valve, the proportional hydraulic valve being progressively alterable between an energising configuration in which it connects the two-position valve to a source of pressurised fluid, and a venting configuration in which it connects the two-position valve to a drain or tank. In a manner explained in more detail below this feature permits the gradual application of the SAHR brake as may be required at certain times during operation of the vehicle.

Conveniently the vehicle of the invention includes a two-position hydraulic valve connected between the hydraulic release valve and the proportional hydraulic valve, the two-position hydraulic valve being capable selectively of connecting (a) the hydraulic release valve and the proportional hydraulic valve one to another; and (b) the hydraulic release valve to a drain or a tank.

This aspect of the invention provides for redundancy of the valving arrangement. This in turn addresses the problem, outlined above of the proportional hydraulic valve becoming stuck in a position preventing venting of the hydraulic fluid pressure acting on the piston.

Further conveniently the vehicle includes a detector that generates a signal in the event of failure of the proportional hydraulic valve the generation of a said signal causing or permitting the two-position hydraulic valve to connect the hydraulic release valve to the drain or tank.

This facet of the invention advantageously provides for automation of the step of the two-position hydraulic valve taking over at least some functions of the proportional hydraulic valve in the event of failure of the latter and in particular jamming of the proportional hydraulic valve. Thus the piston chamber may continue to be vented even if one of the primary control components suffers failure.

In preferred embodiments of the invention the hydraulic release valve, the two-position hydraulic valve and the proportional hydraulic valve are electrically actuated and the vehicle includes one or more control devices for controlling operation of the said valves.

Thus the hydraulic relief valve advantageously may be a solenoid actuated two-position valve in which the action of a solenoid acting under the influence of control elements forming part of or connected to the hydraulic control circuit causes it to overcome its bias towards the one-way flow configuration and act temporarily as a two-way flow device. Similarly the two-position hydraulic valve and the proportional hydraulic valve may selectively connect the hydraulic control circuit to apply pressurised fluid via the hydraulic release valve or to vent the circuit, as needed.

It is further preferable that one or more said control devices detects (i) the speed of the vehicle and (ii) whether an operator-initiated parking braking requirement exists, and determines adjustment of the said valves in dependence on the detected speed and the existence or absence of a commanded parking braking requirement. The hydraulic circuit or components connected thereto may include one or more sensors for sensing the vehicle speed and the existence of a parking brake command. Such sensors may be embodied in various ways known to the person of skill in the art.

Preferably when the detected speed exceeds a threshold value the two-position hydraulic valve and the proportional hydraulic valve are actuated such that the hydraulic release valve is connected to a source of pressurised fluid; and the hydraulic release valve is de-actuated such that pressurised fluid is applied to the second brake element whereby separation of the first and second brake elements from one another occurs. This arrangement prevails when the vehicle is travelling at a speed greater than the threshold speed value.

However when the detected speed is less than a threshold value or is zero and the hydraulic release valve, the two-position hydraulic valve and the proportional hydraulic valve are actuated such that pressurised fluid is applied to the second brake element whereby separation of the first and second brake elements from one another occurs, progressive de-activation of the proportional hydraulic valve controllably vents pressure acting on the second brake element via (i) the hydraulic release valve in its pressure relief configuration, (ii) the two-position hydraulic valve in its energising condition, (iii) the proportional hydraulic valve and (iv) the drain or tank connected thereto whereby progressively to cause mutual engagement of the first and second brake elements.

This arrangement permits the operator of the vehicle progressively to apply the SAHR brake in a park braking operation when the speed of the vehicle is below the threshold and no electrical fault exists that could result in failure of the solenoids that actuate the valves of the hydraulic circuit.

When the vehicle speed is zero and the hydraulic release valve, the two-position hydraulic valve and the proportional hydraulic valve are de-actuated the first and second brake elements are mutually engaged in order to brake rotation of the rotatable element, actuation of the hydraulic release valve, the two-position hydraulic valve and the proportional hydraulic valve causes the application of hydraulic pressure to the second brake element thereby effecting separation of the first and second brake elements from one another.

This condition of the vehicle occurs e.g. when it is moving off from rest and it is necessary to disengage the park brake from its applied condition in which the first and second brake elements are in mutual engagement. Movement of the vehicle from rest can be detected using a range of sensors mounted on the vehicle.

In the foregoing references to detection of the speed of the vehicle may relate to detection of its speed in only one direction such as the forward direction of movement, but preferably relate to detection of the speed of the vehicle when moving in either a forward or a reverse direction.

Preferably the hydraulic control circuit includes one or more detectors of an emergency braking requirement, and when an emergency braking requirement is detected the hydraulic release valve is actuated to alter to its pressure relief configuration; and the proportional hydraulic valve is progressively actuated to its venting configuration to cause controlled connection of the two-position valve to a drain or tank and thereby cause mutual engagement of the first and second brake elements.

Thus in the vehicle of the invention it is possible to apply the SAHR brake in an emergency situation without (by reason of the proportional hydraulic valve) the application of the SAHR brake taking place suddenly. This reduces the risk of accidents.

In yet a further arrangement of the components of the invention when the detected speed is at or near zero the hydraulic release valve adopts its pressure relief configuration, the two-position hydraulic valve adopts its energising configuration and the proportional valve adopts its energising configuration whereby the brake elements are separated from one another, alteration of the proportional valve to its venting configuration and alteration of the two-position hydraulic valve to its venting condition causing mutual engagement of the first and second brake elements, and the vehicle including an interlock that prevents its de-powering until the first and second brake elements are mutually engaged.

This is a park braking configuration that must be invoked before it becomes possible to switch off the engine of the vehicle. This ensures that an operator of the vehicle must apply the SAHR as a park brake before it becomes possible e.g. to remove the smart key of the vehicle and/or to secure its cab against unauthorised access.

Conveniently the source of pressurised fluid is or includes a hydraulic pump that is powered by the vehicle. Preferably the pressure of hydraulic fluid pressurised by the pump is 22 bar.

It is further preferable that the vehicle includes a manually operable hydraulic pump that is operable to oppose the action of the resiliently deformable member. Such an arrangement enables separation of the first and second brake elements from one another even in the event of an electrical fault that prevents operation of the valve solenoids described herein and even in the event of the vehicle engine being switched off. Thus in a vehicle breakdown situation it remains possible to disengage the park brake represented by the SAHR brake should this be desired.

It also is preferable that the second brake element includes or is connected to a piston that lies within a chamber, the hydraulic fluid in the hydraulic control circuit being capable of acting on one side of the piston tending to drive it in a first direction in the chamber, and the resiliently deformable member tending to drive the piston in a second direction in the chamber that is opposite the first direction.

This arrangement conveniently provides for moveable mounting of the second brake element in a manner that permits it to be acted on by hydraulic pressure in the hydraulic control circuit and/or the resiliently deformable spring.

In all of the foregoing arrangements the biasing of the hydraulic release valve means that in the event of an electrical failure leading to a loss of ability to alter the valve configurations the first and second brake elements will be maintained separated from one another (because the hydraulic release valve then is biased to its one-way flow (check valve) configuration). This prevents accidents in the event of an electrical failure arising while the vehicle is in motion.

The manual actuator however may then selectively be used by the vehicle operator to overcome the bias of the biasser acting on the hydraulic release valve and alter the hydraulic circuit configuration in order to apply the SAHR brake.

BRIEF DESCRIPTION OF THE DRAWING FIGURE

There now follows a description of preferred embodiments of the invention, by way of non-limiting example, with reference being made to the accompanying drawing, that shows in schematic form a hydraulic control circuit of a vehicle in accordance with the invention.

DETAILED DESCRIPTION OF THE DRAWING FIGURE

In the drawing figure selected parts of a vehicle, such as but not limited to those listed above, defining a SAHR and control arrangement therefor in accordance with the invention are shown. Thus the major components of the vehicle such as the vehicle frame, engine, transmission, drivetrain, cab and fuelling parts are omitted from the figure for clarity, as are additional features such as hydraulically powered arms and booms that permit specialised vehicles of the kinds exemplified to carry out various tasks.

In FIG. 1 these parts of the vehicle that are not shown in detail are represented schematically by reference numeral 10.

A SAHR brake represented generally by numeral 11 includes a first brake element 12 in the form (in the embodiment shown, although it may take other forms in other embodiments) of a brake disc or drum secured to the axle of a ground-engaging wheel of the vehicle. The first brake element 12 therefore is rotatable and rotates with the wheel with which it is associated, in the conventional manner of brake discs and drums.

In other embodiments of the invention the first brake element could be secured to e.g. a drive shaft such that the SAHR when operative brakes the drive shaft as opposed to a wheel.

A second brake element 13 in the form of a brake pad is moveably, non-rotatably secured to the vehicle 10 e.g. by reason of being mounted on the vehicle frame or a suspension component.

Second brake element 13 is schematically illustrated as a cup-shaped pad that is shaped to bear against the first brake element that in the figure is shown as a circular disc.

Second brake element 13 includes a piston rod 14 protruding rearwardly from it in a direction away from first brake element 12.

Piston rod 14 passes through a sealing aperture 17 in a fluid-tight chamber 16. The nature of the sealing of the aperture 17 relative to the piston rod 14 is to permit sliding movement of the piston rod 14 into and out of the chamber 16 while preventing the egress of hydraulic fluid in the chamber 16.

At its end remote from second brake element 13 piston rod 14 terminates in a piston 18 that slidingly sealingly spans chamber 16 in a manner that is familiar to those skilled in the hydraulic system art.

On its rear face opposite piston rod 14 a resiliently deformable spring 19 that is anchored at one end at the end wall 21 of chamber 16 lying opposite the aperture 17 bears against piston 18 as illustrated.

A hydraulic fluid port 22 allows pressurised hydraulic fluid to act as described below on the front face of piston 18 from which piston rod 14 protrudes. As a result the piston is moveable between limits defined approximately by the aperture 17 and end wall 21 under the influence of hydraulic fluid pressure on the one hand and the spring 19 on the other. By controlling the fluid pressure acting in the chamber 16 it is possible to control the position of the piston with the result that the SAHR brake 11 as a whole permits the second brake element 13 to move towards and away from the first brake element 12 to cause mutual engagement or separation respectively of the brake elements 12, 13.

The SAHR brake thus includes in the form of the spring 19 a resiliently deformable member that urges the first and second brake elements 12, 13 into mutual engagement; and (as described below) a hydraulic circuit that may operate to oppose the effect of the spring 19 and maintain separation of the brake elements 12, 13.

When the elements 12, 13 are mutually engaged braking of the rotation of the wheel or shaft to which first brake element is secured takes place; and when they are separated the wheel or shaft is freely rotatable.

A hydraulic control circuit is connected selectively to supply pressurised hydraulic fluid via the port 22.

The circuit includes, connected in series, a hydraulic release valve 23 directly coupled at one side to the port 22; a two-position hydraulic valve 24 coupled to the opposite side of hydraulic release valve 23 to port 22; and a proportional hydraulic valve 26 coupled to the opposite side of two-position valve 24 to release valve 23. On its opposite side to the connection to two-position valve 24 proportional valve 26 is connectable to a source of pressurised fluid in the form of the outlet 27 of a fluid pump that is driven by the engine of the vehicle 10.

As illustrated schematically in FIG. 1 the valves 23, 24 and 26 are all spring-biassed, solenoid actuated valves.

Hydraulic release valve 23 is a two-position, two way valve that is alterable between a one-way valve (check valve) configuration that permits the application of pressure to the second brake element 13 in the chamber 16 and prevents venting thereof; and a pressure relief configuration that provides two-way flow of hydraulic fluid. The spring 28 of the hydraulic release valve 23 biasses it to the one-way valve configuration. Actuation of the solenoid 29 of the valve 23 opposes the bias of the spring 28 in dependence on e.g. commands generated in a processor forming part of the vehicle. In common with the other valves described herein the valve 23 may be embodied as a spool valve, or as another design of valve if desired.

Two-position hydraulic valve 24 is a solenoid actuated four-way, two position valve. A spring 31 biasses the connection of the valve to a drain or tank 33. The venting of hydraulic fluid from chamber 16 to the drain or tank 33 is possible when (a) the valve 24 is in the position illustrated in FIG. 1 and (b) solenoid 29 of valve 23 is energised to overcome the bias of spring 28 thereby causing valve 23 to adopt its two-way flow configuration.

Energising of solenoid 32 of valve 24 under the influence of commands generated in a processor or other control device associated with the hydraulic control circuit connects the fluid line containing valves 23 and 24 to the outlet of proportional hydraulic valve 26. Depending on the operational condition of valve 26 this has the effect of either connecting the aforesaid fluid line to the source 27 of pressurised fluid or connecting it to a drain or tank 34. Drain/tank 34 in some embodiments of the invention is the same component as drain/tank 33; and in other embodiments may be a separate part of the hydraulic circuit.

Proportional hydraulic valve 26 is a two-position, four way valve including proportional solenoid control. A spring 36 biases the valve to connect the fluid line to the drain 34 referred to above. A proportional solenoid 37 may be selectively energised by way of vehicle cab-mounted controls and one or more control devices such as processors that generate control commands in order to overcome the bias of spring 36 and connect the valve to the source 27.

In one mode of operation the two-position hydraulic valve 24 may provide for redundancy of the proportional hydraulic valve 26. The latter is the most complex valve in the control circuit for the SAHR brake 11 and may be subject to a higher usage duty than the other valves. The proportional hydraulic valve 26 therefore may be slightly more prone to failure than the other valves. If failure of the proportional hydraulic valve 26 results in jamming of the valve spool with the source 27 connected to supply fluid to the remainder of the circuit it would then be impossible to vent the fluid pressure in chamber 16 in order to apply the SAHR brake. The additional valve 24 overcomes this difficulty by permitting such venting even if the proportional hydraulic valve 26 jams as described or otherwise fails.

In addition to the foregoing, valve 23 includes a manual actuator such as a lever or handle 38. This may be provided in a location that is accessible from within the cab of the vehicle such that an operator may manually overcome the biasing effect of spring 28, for example in the event of an electrical fault preventing operation of solenoid 29.

This means that hydraulic release valve 23 always can be converted to its two-way flow configuration with the result that in the event of an electrical fault it remains possible to vent pressurised fluid from chamber 16. In turn this means that it remains possible to apply the SAHR brake in a park braking operation.

Lever 38 includes a ratchet or other detent represented by numeral 39, for latching it in a chosen position following its actuation to achieve the result outlined above. Such a detent typically would be a mechanical device. Lever 38 if desired may be capable of "push-pull" operation. Numerous ways of achieving this will be known to the person of skill in the art.

A manual fluid pump 41 optionally is provided. Pump 41 is operated by way of an external lever 42 connected to a piston 46 that is reciprocable inside a hollow chamber 47. Manual reciprocation of lever 42 causes the piston 46 to reciprocate longitudinally inside chamber 47. An inlet feed 48 draws hydraulic fluid from a drain or tank 44 into which the inlet feed extends. An outlet feed 49 of pump 41 is connectable via a per se known disconnect 43 to fluid port 22.

A per se known arrangement of check valves in the inlet and outlet feeds 48, 49 ensures that as the piston 46 is caused by lever 42 to reciprocate fluid is drawn from drain/tank 44, pressurised in chamber 47 and fed via outlet feed 49 and disconnect 43 to chamber 16 via inlet port 22.

As a result of this arrangement it is possible manually to apply pressurised fluid to piston 18 and thereby move second brake element 13 out of engagement with first brake element 12 even when the vehicle is completely de-powered and its engine inoperative. Thus it is possible using the pump 41 to release the SAHR brake for instance in the event of an engine breakdown.

The SAHR brake arrangement illustrated in FIG. 1 may be operated in a number of modes, as follows:

Normal Driving Mode

This mode is defined when the detected speed of the vehicle exceeds a threshold value that can be set e.g. in software in a control device such as a processor operatively connected to the circuit visible in FIG. 1.

In this mode the two-position hydraulic valve 24 and the proportional hydraulic valve 26 are actuated such that they are moved away from the normal positions shown in FIG. 1. As a result the hydraulic release valve 23 is connected to a source of pressurised fluid in its de-actuated (one-way flow) configuration such that pressurised fluid is applied to the piston 18. This opposes the bias of spring 19 acting on second brake element 13 whereby separation of the first and second brake elements from one another occurs and the vehicle is free to move without any braking influence from the SAHR brake 11.

Since at this time the hydraulic release valve 23 is in its one-way check valve configuration, venting of pressurised fluid in cylinder 16 does not occur even in the event of a failure of the electrical system that powers the solenoids of the valves 23, 24 and 26. Operation of the SAHR brake in this mode may be rendered independent of vehicle speed. This may be achieved through appropriate programming of control devices forming part of the SAHR brake.

Zero/Very Low Speed SAHR Braking Mode

This mode arises when the speed detected by the aforementioned sensor(s) is less than a threshold value or is zero.

At such a time the hydraulic release valve 23, the two-position hydraulic valve 24 and the proportional hydraulic valve 26 are all actuated (energised) such that pressurised fluid is applied to the piston 18 acting on second brake element 13 and overcomes the baissing effect of the spring 19. As a result separation of the first and second brake elements 12, 13 from one another occurs.

Progressive de-activation of the proportional hydraulic valve 26 under the influence of control commands generated as explained above controlledly vents pressure acting on the piston 18 via (i) the hydraulic release valve 23 in its pressure relief configuration, (ii) the two-position hydraulic valve 24 in its energising condition, (iii) the proportional hydraulic valve 26 and (iv) the drain or tank 34 connected thereto whereby progressively to cause mutual engagement of the first and second brake elements 12, 13 and hence the application of the SAHR brake in a park braking operation.

Park Brake Disengagement Mode

This arises when the detected vehicle speed is zero and the hydraulic release valve 23, the two-position hydraulic valve 24 and the proportional hydraulic valve 26 are de-actuated with the consequence that the first and second brake elements 12, 13 are mutually engaged in order to brake rotation of the rotatable element. At such a time actuation of the hydraulic release valve 23, the two-position hydraulic valve 24 and the proportional hydraulic valve 26 causes the application of hydraulic pressure to the piston 18 thereby effecting separation of the first and second brake elements 12, 13 from one another.

This sequence can be initiated by for example detection of the initiation of movement of the vehicle following a period when the vehicle is at rest with the SAHR brake applied. Thus for instance one or more sensors can be arranged to detect in the vehicle the selection of a transmission ratio from neutral and an increase in engine torque as indicators that the park brake disengagement sequence should commence.

Emergency Braking Mode

An emergency braking mode can be initiated if as described above the vehicle includes in the hydraulic control circuit (or connected to it) one or more detectors of an emergency braking requirement.

When an emergency braking requirement is detected by such a sensor the hydraulic release valve 23 is actuated to alter to its pressure relief configuration; and the proportional hydraulic valve 26 is progressively actuated to its venting configuration to cause controlled connection of the two-position valve to a drain or tank and thereby cause mutual engagement of the first and second brake elements. In this way the SAHR brake is applied to slow the vehicle. The progressive nature of the application of the SAHR brake resulting from the presence of the proportional hydraulic valve 26 means that the risk of accidents that would otherwise arise from the sudden application of the SHAR brake is eliminated.

Park Braking Safety Mode

When the detected vehicle speed is at or near zero the hydraulic release valve 23 as noted may adopt its pressure relief configuration, the two-position hydraulic valve 24 its energising configuration and the proportional hydraulic valve 26 its energising configuration whereby the brake elements 12, 13 are separated from one another.

Alteration of the proportional hydraulic valve 26 to its venting configuration and alteration of the two-position hydraulic valve 24 to its venting condition causes mutual engagement of the first and second brake elements 12, 13. The vehicle can include an optional interlock that prevents de-powering of the vehicle at such a time until the first and second brake elements 12, 13 are mutually engaged.

The interlock may be a mechanical device but more typically would be electromechanical or could be embodied in software in a processor operatively connected to the hydraulic control circuit. The effect of the interlock could be for example to render inoperative a smart key release mechanism such that the smart key could not be released from an activation port in the operator's cab until the first and second brake elements 12, 13 are mutually engaged.

Valve Failure Mode

As explained above, two-position hydraulic valve 24 may provide venting redundancy of the proportional hydraulic valve 26 fails.

The control circuit of the invention may include one or more sensors that detect such failure and generate one or more signals indicating this. Such signals may be used to generate commands to the solenoid of two-position hydraulic 24 valve causing the latter to vent hydraulic fluid from the chamber 16 and thereby cause the SAHR brake 11 to be applied. Such commands may be emergency tracking commands that cause the SAHR brake 11 to be applied immediately. More typically however such commands would interlock with driver-initiated commands for the SAHR brake 11 to be applied.

As indicated the vehicle of the invention may include as many sensors as are required to monitor the operator of the SAHR brake 11 and generate various commands as described herein.

The vehicle may include one or more programmable devices such as but not limited to microprocessors, line controllers and CAN-BUS modes in order to provide for the control actions indicated. Such programmable devices may further provide additional functions within the vehicle, or may be dedicated in the sense of controlling only the SAHR brake arrangements. The programmable devices(s) may be user-configurable but more probably would be programmed by way of factory-installed firmware.

Overall the invention provides a highly versatile SAHR-based braking system that provides improved safety compared with prior art arrangements.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A powered vehicle comprising:
a spring-applied hydraulic release (SAHR) vehicle brake comprising:
a first brake element that is secured to or forms part of a rotatable element of a drive train of the vehicle;
a second brake element that is non-rotatably moveably mounted on the vehicle such that the first and second brake elements are mutually engageable with and separable from one another, where such mutual engagement of the brake elements causes braking of rotation of the rotatable element;
a resiliently deformable member acting on the second brake element so as to urge the first and second brake elements into mutual engagement; and
a hydraulic control circuit configured to apply hydraulic pressure to the second brake element so as to oppose the action of the resiliently deformable member and thereby maintain the first and second brake elements separated from one another;
a non-electric fail-safe comprising a hydraulic release valve that is configured to be alterable between a one-way valve configuration effective when a driving mode of the vehicle is selected and that permits the application of pressure to the second brake element and prevents venting thereof; and
a pressure relief configuration configured to provide two-way flow of hydraulic fluid via the hydraulic release valve,
wherein the hydraulic release valve including a biasser biasing the hydraulic release valve to the one-way valve configuration, and
wherein the hydraulic control circuit includes a proportional hydraulic valve connected in series with the hydraulic release valve, the proportional hydraulic valve being progressively alterable between an energizing configuration in which it connects the hydraulic release valve to a source of pressurized fluid, and a venting configuration in which it connects the hydraulic release valve to a drain or tank, and
the powered vehicle further comprising a two-position hydraulic valve connected between the hydraulic release valve and the proportional hydraulic valve, the two-position hydraulic valve being configured to selectively connect (a) the hydraulic release valve and the proportional hydraulic valve one to another; and (b) the hydraulic release valve to a drain or a tank.

2. The vehicle of claim 1, wherein the hydraulic release valve includes a manual actuator configured to overcome the bias of the biasser and manually select the pressure relief configuration in preference to the one-way valve arrangement.

3. The vehicle of claim 1, wherein the hydraulic release valve, that normally assures the application of hydraulic pressure to the second brake element, causes or permits venting of such pressure to allow mutual engagement of the first and second brake elements under the influence of the resiliently deformable member when the speed of the vehicle is below a threshold.

4. The vehicle of claim 1, further comprising a detector that generates a signal in the event of failure of the proportional hydraulic valve the generation of a said signal causing or permitting the two-position hydraulic valve to connect the hydraulic release valve to the drain or tank.

5. The vehicle of claim 1, wherein the hydraulic release valve and the proportional hydraulic valve are electrically actuated and the vehicle includes one or more control devices for controlling operation of the said valves.

6. The vehicle of claim 5, wherein one or more said control devices detects (i) the speed of the vehicle and (ii) whether an operator-commanded parking braking requirement exists and determines adjustment of the said valves in dependence on the detected speed and the existence or absence of a commanded parking braking requirement.

7. The vehicle of claim 6, wherein when the detected speed exceeds a threshold value the proportional hydraulic valve is actuated such that the hydraulic release valve is connected to a source of pressurised fluid; and the hydraulic release valve is de-actuated such that pressurised fluid is applied to the second brake element whereby separation of the first and second brake elements from one another occurs.

8. The vehicle of claim 7, wherein when the detected speed is less than a threshold value or is zero and the hydraulic release valve and the proportional hydraulic valve are actuated such that pressurised fluid is applied to the second brake element whereby separation of the first and second brake elements from one another occurs, progressive de-activation of the proportional hydraulic valve controlledly vents pressure acting on the second brake element via (i) the hydraulic release valve in its pressure relief configuration, (ii) the proportional hydraulic valve and (iii) the drain or tank connected thereto whereby progressively to cause mutual engagement of the first and second brake elements.

9. The vehicle of claim 6, or any preceding claim depending therefrom wherein when the vehicle speed is zero and the hydraulic release valve and the proportional hydraulic valve are de-actuated the first and second brake elements are mutually engaged in order to brake rotation of the rotatable element, actuation of the hydraulic release valve and the proportional hydraulic valve causing the application of hydraulic pressure to the second brake element thereby effecting separation of the first and second brake elements from one another.

10. The vehicle of claim 7, wherein the hydraulic control circuit includes or is operatively connected to one or more detectors of an emergency braking requirement, and when an emergency braking requirement is detected the hydraulic release valve is actuated to alter to its pressure relief configuration; and the proportional hydraulic valve is progressively actuated to its venting configuration to cause controlled connection to a drain or tank and thereby cause mutual engagement of the first and second brake elements.

11. The vehicle of claim 6, wherein when the detected speed is at or near zero the hydraulic release valve adopts its pressure relief configuration and the proportional valve adopts its energising configuration whereby the brake elements are separated from one another, alteration of the proportional valve to its venting configuration and alteration of the two-position hydraulic valve to its venting condition cause mutual engagement of the first and second brake elements, the vehicle including an interlock that prevents its de-powering until the first and second brake elements are mutually engaged.

12. The vehicle of claim 1, further comprising a manually operable hydraulic pump that is configured to oppose the action of the resiliently deformable member.

13. The vehicle of claim 1, wherein the second brake element includes or is connected to a piston that lies within a chamber, the hydraulic fluid in the hydraulic control circuit being capable of acting on one side of the piston tending to drive it in a first direction in the chamber, and the resiliently deformable member tending to drive the piston in a second direction in the chamber that is opposite the first direction.

* * * * *